United States Patent
Rosso et al.

(10) Patent No.: US 11,646,583 B2
(45) Date of Patent: May 9, 2023

(54) POWER FLOW CONTROL DEVICE AND WIND FARM INCLUDING A POWER FLOW CONTROL DEVICE

(71) Applicant: Wobben Properties GmbH, Aurich (DE)

(72) Inventors: Roberto Rosso, Aurich (DE); Sönke Engelken, Bremen (DE); Marco Liserre, Kiel (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/276,053

(22) PCT Filed: Aug. 22, 2019

(86) PCT No.: PCT/EP2019/072482
§ 371 (c)(1),
(2) Date: Mar. 12, 2021

(87) PCT Pub. No.: WO2020/052936
PCT Pub. Date: Mar. 19, 2020

(65) Prior Publication Data
US 2022/0045516 A1 Feb. 10, 2022

(30) Foreign Application Priority Data
Sep. 14, 2018 (DE) .................... 10 2018 122 587.3

(51) Int. Cl.
*H02J 3/38* (2006.01)
*H02J 3/32* (2006.01)
*H02J 3/24* (2006.01)

(52) U.S. Cl.
CPC ............... *H02J 3/381* (2013.01); *H02J 3/24* (2013.01); *H02J 3/32* (2013.01); *H02J 2300/28* (2020.01)

(58) Field of Classification Search
CPC ...... H02J 3/381; H02J 3/24; H02J 3/32; H02J 2300/28
(Continued)

(56) References Cited

U.S. PATENT DOCUMENTS 9,300,142 B2 * 3/2016 Tarnowski .......... H02P 21/0003
2005/0225090 A1 10/2005 Wobben
(Continued)

FOREIGN PATENT DOCUMENTS

CN 104578046 A 4/2015
DE 102012107602 A 5/2014
(Continued)

*Primary Examiner* — Hal Kaplan
(74) *Attorney, Agent, or Firm* — Seed Intellectual Property Law Group LLP

(57) ABSTRACT

A wind farm for supplying electrical power into a supply grid. The farm includes wind power installations, a farm grid connecting the installations, and a power flow control device. The power flow control device is configured to connect the farm grid and the supply grid such that an electrical power generated by the installations can be supplied into the supply grid. The power flow control device has at least: a DC link configured to conduct at least the electrical power generated by the installations, an electrical energy store connected to the DC link, an inverter connected to the DC link and configured to inject at least the electrical power generated by the installations into the supply grid, and a controller configured to drive the inverter in such a way that the farm, at the supply grid, in the steady state appears to be dynamic like an electromechanical synchronous machine.

12 Claims, 3 Drawing Sheets

(58) Field of Classification Search
USPC .......................................................... 307/84
See application file for complete search history.

(56) References Cited

U.S. PATENT DOCUMENTS

2011/0137481 A1   6/2011   Manz et al.
2012/0292904 A1   11/2012  Tarnowski

FOREIGN PATENT DOCUMENTS

DE      102014016664 A1    5/2016
EP           2339713 A2    6/2011

* cited by examiner

POWER FLOW CONTROL DEVICE AND WIND FARM INCLUDING A POWER FLOW CONTROL DEVICE

BACKGROUND

Technical Field

The present invention relates to a wind farm having a power flow control device and to such a power flow control device.

Description of the Related Art

Wind farms generally have a plurality of wind power installations, which are connected to one another via a common wind farm grid.

In order to inject the electrical power generated by means of the wind power installations into an electrical power supply grid, the wind farm grid is generally further connected to the electrical power supply grid by means of a connecting line and a transformer.

The increasing penetration of the electrical power supply grid with converter-fed generating units, such as, for example, wind power installations and photovoltaic installations, results in an increasing replacement of conventional generating units, such as, for example, coal-fired power stations, which generally have a synchronous generator which is coupled directly to the electrical power supply grid.

As a result of these changes, there is likewise a shift in the system response of the electrical power supply grid, as a result of which wind power installations need to fulfil ever more stringent requirements in order both to be able to be operated stably on the electrical power supply grid and also to operate the electrical power supply grid stably.

In order to fulfil these requirements, ever more modern closed-loop control methods are created which need to be implemented individually in a complex manner in each wind power installation and, if required, also need to be installed with hardware.

This procedure is generally extremely cost-intensive or sometimes cannot be implemented in already existing wind power installations for technical reasons.

The German Patent and Trademark Office has searched the following prior art in respect of the priority application relating to the present application: US 2012/0292904 A1, DE 10 2012 107 602 A1, CN 104 578 046 A and DE 10 2014 016 664 A1.

BRIEF SUMMARY

An improved connection between the wind farm and the electrical power supply grid is provided.

A wind farm for injecting or supplying electrical power into an electrical power supply grid is proposed.

For this purpose, the wind farm comprises a plurality of a wind power installations, which have, for example, a synchronous generator comprising a full-power converter (full-scale converter).

The wind power installations themselves are connected to one another by means of an electrical wind farm grid, for example the wind power installations have, for this purpose, a transformer which is arranged between the full-power converter and the wind farm grid.

The wind farm grid itself, which may be in the form of an AC grid or in the form of a DC grid, has, in the same way as the electrical power supply grid, electrical characteristic variables, such as, for example, voltage and rated voltage or frequency and rated frequency.

The rated voltage of the wind farm grid, the rated wind farm voltage, is in this case preferably less than the rated voltage of the electrical power supply grid, the rated power supply grid voltage. For example, the rated wind farm grid voltage is 630 V, and the rated power supply grid voltage is 10 kV or 20 kV.

In order to arrive at the rated power supply grid voltage starting from the rated wind farm grid voltage, wind farms generally have a transformer.

One disadvantage with this conventional solution consists in that a transformer is only designed to set the voltage amplitude, but not the frequency.

As a result, all of the closed-loop control methods need to be implemented in each individual wind power installation, which can be very cost-intensive.

Provided is using a power flow unit (control device) for the connection between the wind farm grid and the electrical power supply grid.

The power flow unit is therefore at least designed to connect the electrical wind farm grid and the electrical power supply grid to one another in such a way that an electrical power generated by the plurality of wind power installations can be injected into the electrical power supply grid.

The power flow unit is therefore preferably arranged on a or the connecting line between the wind farm and the electrical power supply grid and is designed to conduct the total wind farm power.

In addition, the power flow unit has at least one DC link, which is designed to conduct at least the electrical power generated by the plurality of wind power installations.

In a preferred embodiment, for this purpose, the DC link is configured in modular fashion or is formed from a plurality of power cabinets.

In addition, the power flow unit has an electrical energy store connected to the DC link.

The electrical energy store may be, for example, an electrical battery, wherein the power class is selected corresponding to the wind farm power, in particular in order to realize the function called up by a control unit (controller) for the power flow unit independently of the instantaneous power of the wind power installations. For example, the electrical energy store is configured in such a way that it can provide at least 30 percent of the rated wind farm power for at least 20 seconds. The electrical energy store is therefore at least designed to enable a black start of the wind farm.

Furthermore, the power flow unit also has an inverter, which is connected to the DC link and is designed to inject at least the electrical power generated by the plurality of wind power installations into the electrical power supply grid. Preferably, the inverter is driven by means of a tolerance band method.

The power flow unit is therefore constructed in such a way that the power flow which is generated by the wind power installations takes place from the wind farm grid, into the link, to the inverter and then into the electrical power supply grid. Preferably, for this purpose, the inverter is constructed in modular fashion or has a plurality of power cabinets connected in parallel.

In a preferred embodiment, the power flow unit or the component parts thereof are at least dimensioned in such a way that the power flow unit can conduct the rated power of the wind farm which results, for example, from the sum of the rated powers of the wind power installations. If further generating units (generators) or stores are arranged in the electrical wind farm grid, these are preferably taken into consideration in the determination of the rated power of the wind farm.

Preferably, the electrical store is further configured in such a way that it has at least a store capacity of 20 percent of the rated wind farm power or of a peak wind farm power.

In a further preferred embodiment, the power flow unit and in particular the inverter are therefore at least dimensioned in such a way that the power flow unit can conduct 120 percent of the rated power of the wind farm.

Particularly advantageous as a result of the arrangement of an inverter between the wind farm grid and the electrical power supply grid is the fact that both the voltage and the frequency can be set. As a result, it is possible, for example, to implement frequency-controlling methods directly in the power flow unit. In this way, for example, it is possible to dispense with reactive power control within the wind power installations. In addition, this has the advantage that frequency-controlling methods do not need to be installed in each individual wind power installation of the wind farm, which can mean a considerable cost saving.

If the power flow unit additionally has DC isolation, for example as a result of a DC-DC converter, it is additionally possible to dispense with the conventional wind farm transformer. Furthermore, it is then also possible to operate in such a way as to apply a voltage to the wind farm grid by means of a further inverter.

In addition, the power flow unit additionally has a control unit, which is designed to drive at least the inverter in such a way that the wind farm, at the electronic power supply grid, in the steady state appears to be dynamic like an electromechanical synchronous machine.

It is therefore in particular proposed that the power flow unit operates as a virtual synchronous machine. That is to say that the wind farm acts as a large synchronous generator from the point of view of the electrical power supply grid.

Particularly advantageous here is the fact that, although the individual wind power installations are controlled by a converter, the wind farm, for the electrical power supply grid, has the appearance of a synchronous generator.

This in turn means that conventional power stations can be replaced by wind farms maintaining the correct power without the system response of the electrical power supply grid significantly changing. This can also be achieved in particular by virtue of the fact that, in the case of already existing wind farms, a power flow unit is installed between the wind farm grid and the electrical power supply grid.

Provided is a unit, namely a power flow unit, at the wind farm point of connection which represents a type of "adapter" for the wind farm, in order that the development complexity involved is reduced.

In a further preferred embodiment, in addition a rectifier or inverter can be provided on the wind farm grid side in the power flow unit, and the control unit can be designed to drive the power electronics of the power flow unit in such a way that the power flow unit operates in such a way as to apply a voltage to the wind farm grid.

This additionally increases the stability of the installations and makes it possible to operate a wind farm on an electrical power supply grid with a very low short circuit ratio (SCR). The wind farm and/or the power flow unit are therefore particularly well suited to weak grids, i.e., electrical power supply grids with a very low short circuit ratio at the grid point of connection of the wind farm.

In a preferred embodiment, the power flow unit described above or below is in the form of a smart transformer.

Preferably, the power flow unit further has a rectifier, which is connected to the electrical wind farm grid and to the DC link and is designed to conduct at least the electrical power generated by the plurality of wind power installations.

The power flow unit therefore has, on the wind farm grid side, a further inverter or an actively controlled rectifier or an AC-DC converter.

The power flow unit itself therefore has a full-power converter concept, which connects an AC-conducting wind farm grid to an AC-conducting power supply grid.

In a preferred embodiment, the rectifier is actively controlled and operates in such a way as to apply a voltage to the wind farm grid.

Particularly advantageous here is the fact that such a rectifier additionally stabilizes the wind power installations located in the wind farm.

Preferably, the power flow unit further has a DC-DC converter, which is arranged between the rectifier and the inverter in such a way that the power flow unit has a further DC link, in particular wherein the DC-DC converter enables a DC isolation between the rectifier and the inverter.

The power flow unit therefore has a first DC link between the rectifier and the DC-DC converter and a second DC link between the DC-DC converter and the inverter.

The DC-DC converter is in particular designed to enable a DC isolation between the rectifier and the inverter.

This makes it possible in particular for the wind power installations to be decoupled from the electrical power supply grid, which enables a simpler configuration of the wind power installations. For example, it is thus possible to dispense with reactive power setting of the wind power installations since the reactive power setting of the wind farm is performed by the power flow unit.

Preferably, the power flow unit further has a DC-DC converter between the DC link and the electrical energy store, which DC-DC converter is in particular designed in such a way that the electrical energy store can receive and/or output electrical power independently of a power flow between the wind farm and the electrical power supply grid.

It is further proposed that the electrical store is also galvanically decoupled, in particular from the DC link of the power flow unit.

This makes it possible in particular for the electrical store to be operated substantially independently of the operating state of the electrical power supply grid or wind farm.

Preferably, the electrical energy store is connected to the DC link between the DC-DC converter, which is arranged between the rectifier and the inverter, and the inverter.

Preferably, the power flow unit is designed in such a way that the wind farm can be operated in such a way as to apply a voltage to the electrical power supply grid. The power flow unit is therefore designed to provide a voltage even when there is no load connected. This means in particular that the power flow unit is designed to provide a voltage without injecting a current.

Provided is a power flow unit which is configured as described above or below.

BRIEF DESCRIPTION OF THE SEVERAL VIEWS OF THE DRAWINGS

The present invention will now be explained in more detail below by way of example using exemplary embodiments with reference to the attached figures.

DETAILED DESCRIPTION

Figure 1:
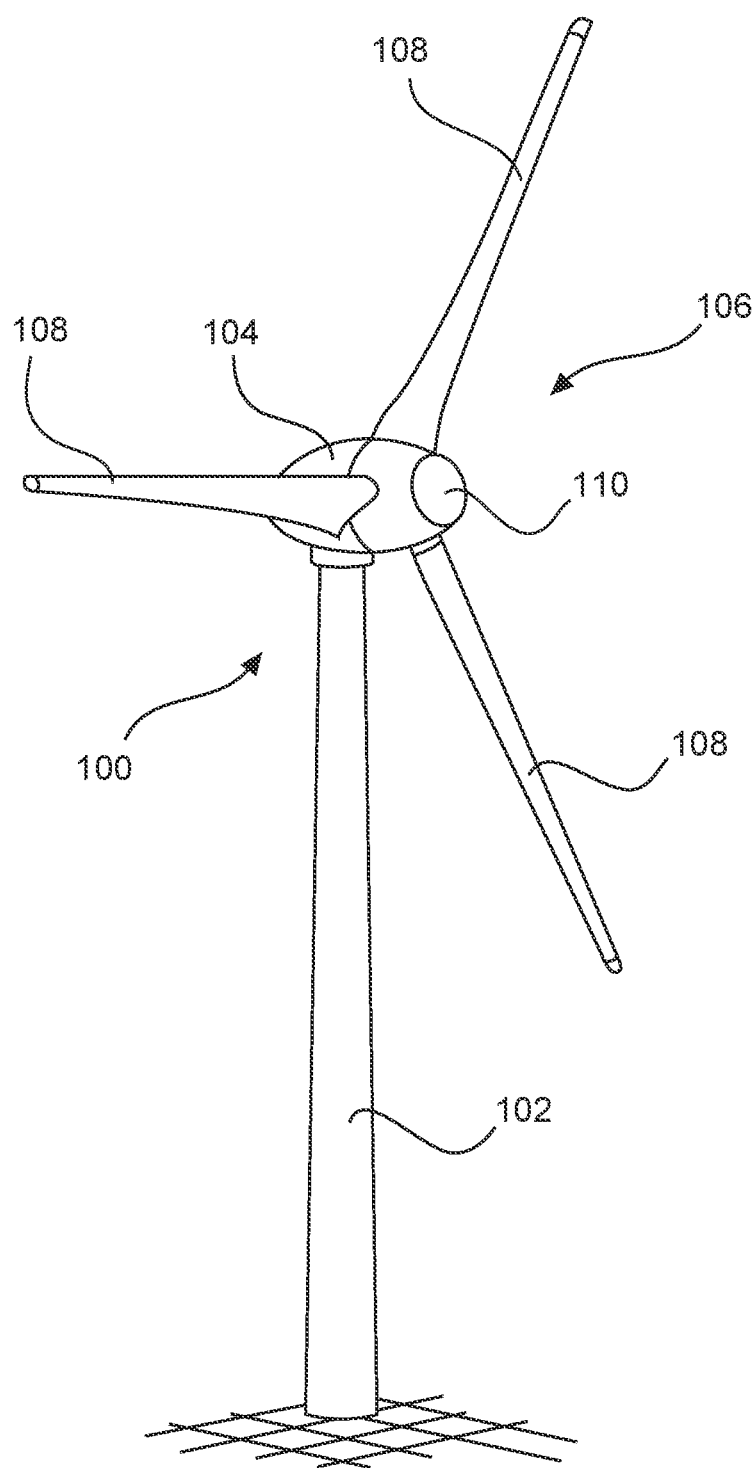
FIG. 1 shows a schematic view of a wind power installation of a wind farm.

FIG. 1 shows a wind power installation 100 of a wind farm.

The wind power installation 100 has, for this purpose, a tower 102 and a nacelle 104. An aerodynamic rotor 106 having three rotor blades 108 and a spinner 110 is arranged on the nacelle 104. The rotor 106, during operation, is caused to move in rotary fashion by the wind and thereby drives a generator in the nacelle 104. The generator thus generates a current, which is passed, by means of a full-power converter, to a wind power installation transformer, which is connected to a wind farm grid.

Figure 2:
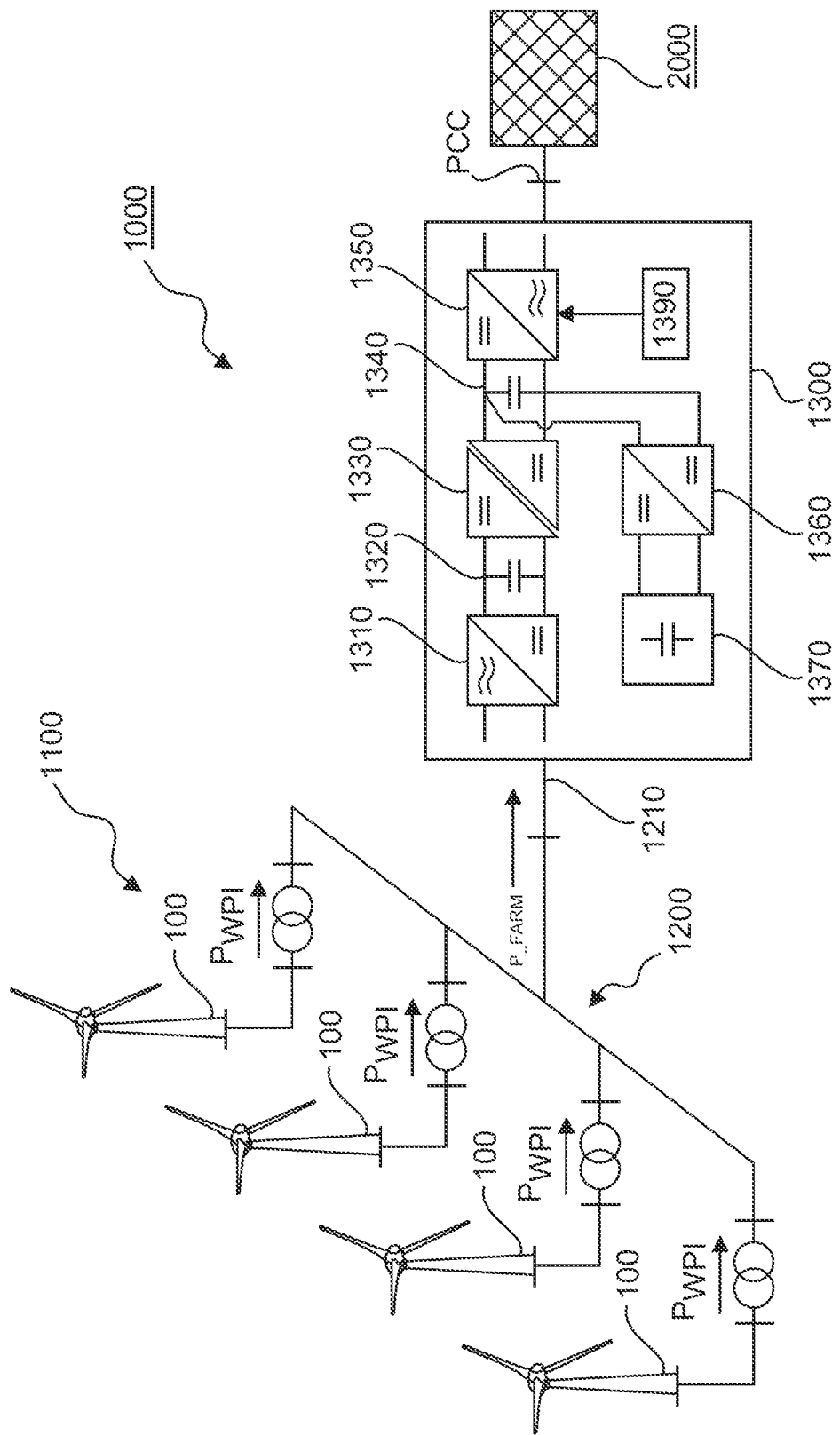
FIG. 2 shows a schematic design of a wind farm according to one embodiment.

FIG. 2 shows a schematic design of a wind farm 1000 according to one embodiment.

The wind farm 1000, for injecting electrical power at the point of common coupling PCC, is connected to an electrical power supply grid 2000, wherein the power supply grid 2000 has a power supply grid voltage V_grid, a rated power supply grid voltage V_grid rated, a power supply grid frequency f_grid and a rated power supply grid frequency f_grid rated.

For this purpose, the wind farm 1000 comprises a plurality of wind power installations 1100, for example four wind power installations 100, as preferably shown in FIG. 1, which each generate a wind power installation power P_WPI.

The plurality of wind power installations 1100 is connected to one another via a common electrical wind farm grid 1200, wherein the wind farm grid 1200 has a wind farm voltage V_farm, a rated wind farm voltage V_farm rated, a wind farm frequency f_farm and a rated wind farm frequency f_farm rated.

In order to inject the electrical wind farm power P_FARM, which is composed of the individual wind power installation powers P_WPI, into the electrical power supply grid 2000, the wind farm grid 1200 has a connecting line 1210 to the point of common coupling PCC.

The power flow unit (power flow control device) 1300 is arranged on this connecting line 1210. Preferably, the total wind farm power P_farm is therefore conducted via the power flow unit 1300.

In this embodiment, therefore, the power flow unit 1300 replaces the conventional wind farm transformer.

The power flow unit 1300 is therefore designed to connect the electrical wind farm grid 1200 and the electrical power supply grid 2000 to one another in such a way that an electrical power P_WPI generated by the plurality of wind power installations 1100 can be injected into the electrical power supply grid 1200.

For this purpose, the power flow unit 1300 has a rectifier 1310, a first DC link 1320, a DC-DC converter 1330, a second DC link 1340, an inverter 1350, a further DC-DC converter 1360, an electrical store (battery) 1370 and a control unit (controller) 1390.

The rectifier 1310 is connected to the electrical wind farm grid 1200 and the first DC link 1320 and is designed to conduct at least the electrical power P_WPI generated by the plurality of wind power installations 1100. In a preferred embodiment, the rectifier 1310 is actively controlled and operates in such a way as to apply a voltage to the wind farm grid 1200.

The first DC link 1320 is connected to the rectifier 1310 and the second DC-DC converter 1330.

The DC-DC converter 1330 is connected to the first DC link 1320 and the second DC link 1340. The DC-DC converter 1330 is therefore arranged between the rectifier 1310 and the inverter 1350 in such a way that the power flow unit 1300 has a first and a second DC link 1320, 1340.

The second DC link 1340 is connected to the DC-DC converter 1340, the inverter 1350 and the second DC-DC converter 1360.

The inverter 1350 is connected to the second DC link 1340 and the point of common coupling PCC. The inverter is therefore designed to inject at least the electrical power P_WPI generated by the plurality of wind power installations 1100 into the electrical power supply grid 2000.

The second DC-DC converter 1360 is connected to the second DC link 1340 and the electrical energy store 1370. The electrical energy store 1370 is therefore connected to the DC link 1340 between the DC-DC converter 1330 and the inverter 1350.

In a preferred embodiment, the electrical energy store 1370 and the DC-DC converter 1360 are configured as a single assembly. This means in particular that they have an assigned control group, which is responsible for the interaction between the energy store 1370 and the DC-DC converter 1360.

The DC-DC converters 1330, 1360 in this case in particular enable power transport in two directions. Thus, the DC-DC converter 1330 in the DC links 1320, 1340 makes it possible for the power flow unit 1300 to be able to receive and/or output active and/or reactive power, i.e., can operate in the four-quadrant mode. The DC-DC converter 1360 of the electrical store 1370 additionally makes it possible for the electrical store 1360 to be able to receive and/or output electrical power independently of the power flow between the rectifier 1310 and the inverter 1350.

The control unit 1390 is further at least designed to drive at least the inverter 1350 in such a way that the wind farm 1000, at the electronic power supply grid 2000, in the steady state appears to be dynamic like an electromechanical synchronous machine.

In addition, the control unit or the power flow unit 1300 is also at least designed in such a way that the wind farm 1000 can be operated in such a way as to apply a voltage to the electrical power supply grid 2000.

The embodiment shown in FIG. 2 therefore substantially consists of two AC-DC converters 1310, 1350, which are connected by an additional DC-DC converter 1330.

As a result, DC isolation between the two sides of the power flow unit 1300 and isolation to form two links 1320, 1340 is made possible.

Particularly advantageous here, in addition to the DC isolation, is the fact that, owing to the isolated links 1320 1340, two different voltage levels can be used, which enables a modular design of the power flow converter 1300. In particular, as a result, standardized power electronics can be used.

In particular, the DC isolation by the DC-DC converter 1330 makes it possible for there to be no need for a transformer between the wind farm 1000 and the electrical power supply grid 2000.

For example, the first DC link 1320 has 690 V, and the second DC link 1340 has 1000 V. As a result, a rectifier 1310 with an output voltage of 690 V can be used, whereas the electrical store has an output voltage of 1000 V, for example.

Figure 3:
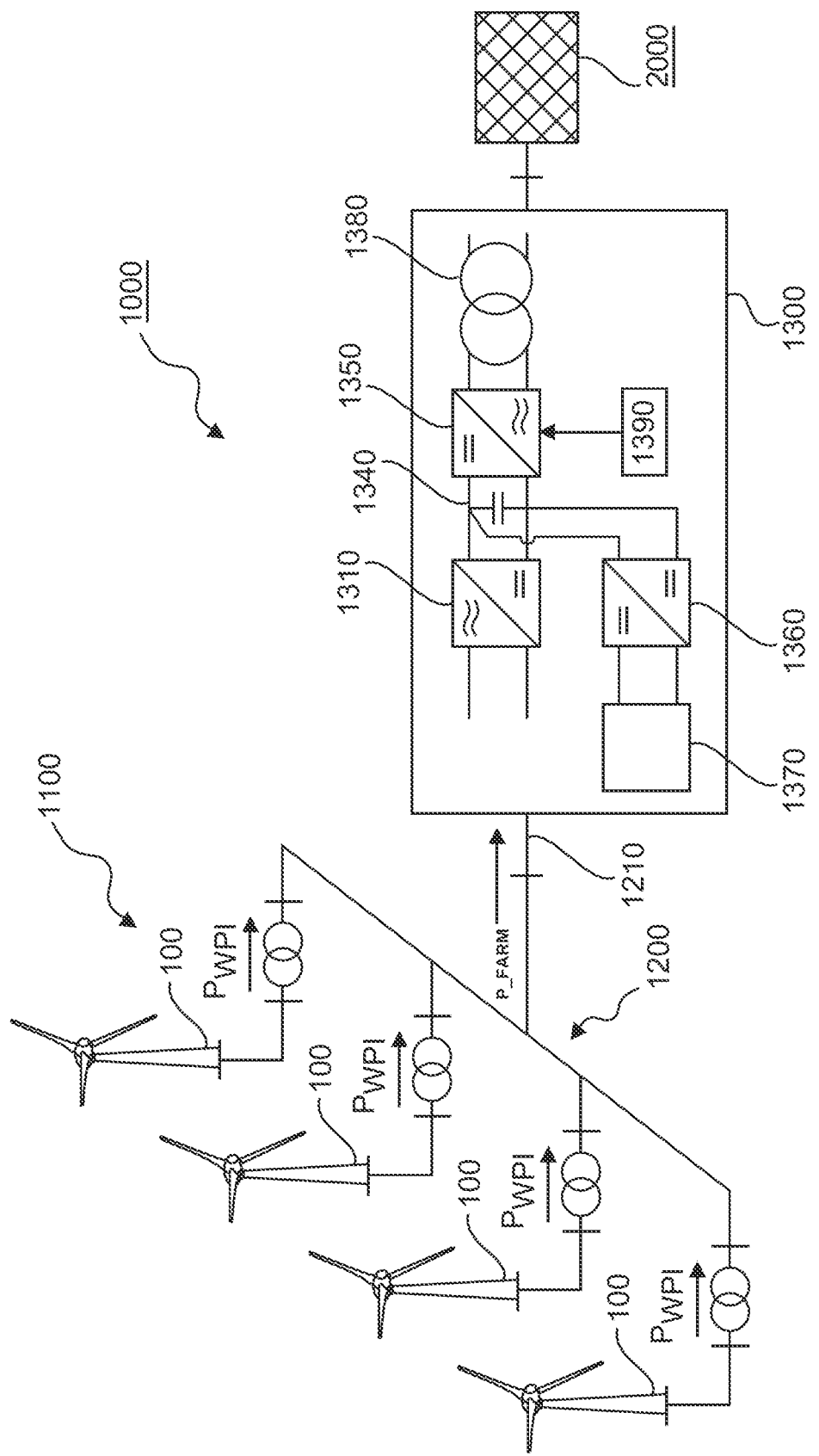
FIG. 3 shows a schematic design of a wind farm according to a further embodiment.

FIG. 3 shows a schematic design of a wind farm 1000 according to a further embodiment.

The wind farm 1000, for injecting electrical power at the point of common coupling PCC, is connected to an electrical power supply grid 2000, wherein the power supply grid 2000 has a power supply grid voltage V_grid, a rated power supply grid voltage V_grid rated, a power supply grid frequency f_grid and a rated power supply grid frequency f_grid rated.

For this purpose, the wind farm 1000 comprises a plurality of wind power installations 1100, for example four wind power installations 100, as preferably shown in FIG. 1, which each generate a wind power installation power P_WPI.

The plurality of wind power installations 1100 is connected to one another via a common electrical wind farm grid 1200, wherein the wind farm grid 1200 has a wind farm voltage V_farm, a rated wind farm voltage V_farm rated, a wind farm frequency f_farm and a rated wind farm frequency f_farm rated.

In order to inject the electrical wind farm power P_FARM, which is composed of the individual wind power installation powers P_WPI, into the electrical power supply grid 2000, the wind farm 1200 has a connecting line 1210 to the point of common coupling PCC.

The power flow unit 1300 is arranged on this connecting line 1210. Preferably, the total wind farm power P_farm is therefore conducted via the power flow unit 1300.

The power flow unit 1300 in this embodiment comprises a transformer 1380. Said transformer may belong to the power flow unit 1300 and can replace the conventional wind farm transformer 1380 or be the conventional wind farm transformer 1380.

The power flow unit 1300 is therefore designed to connect the electrical wind farm grid 1200 and the electrical power supply grid 1200 to one another in such a way that an electrical power P_WPI generated by the plurality of wind power installations 1100 can be injected into the electrical power supply grid 1200.

For this purpose, the power flow unit 1300 has a rectifier 1310, a DC link 1340, an inverter 1350, a DC-DC converter 1360, an electrical store 1370 and a control unit 1390.

The rectifier 1310 is connected to the electrical wind farm grid 1200 and the DC link 1340 and is designed to conduct at least the electrical power P_WPI generated by the plurality of wind power installations 1100. In a preferred embodiment, the rectifier 1310 is actively controlled and operates in such a way as to apply a voltage to the wind farm grid 1200.

The DC link 1340 is connected to the rectifier 1310, the inverter 1350 and the DC-DC converter 1360.

The inverter 1350 is connected to the DC link 1340 and the point of common coupling PCC. The inverter 1350 is therefore designed to inject at least the electrical power P_WPI generated by the plurality of wind power installations 1100 into the electrical power supply grid 2000.

The DC-DC converter 1360 is connected to the DC-link 1340 and the electrical energy store 1370. The electrical energy store 1370 is therefore connected to the DC link 1340 between the DC-DC converter 1330 and the inverter 1350.

In a preferred embodiment, the electrical energy store 1370 and the DC-DC converter 1360 are configured as a single assembly. This means in particular that they have an assigned control group, which is responsible for the interaction between the energy store 1370 and the DC-DC converter 1360.

The DC-DC converter 1360 in this case enables in particular power transport in two directions. Thus, the DC-DC converter 1360 of the electrical store 1370 makes it possible for the electrical store 1360 to be able to receive and/or output electrical power independently of the power flow between the rectifier 1310 and the inverter 1350.

The control unit 1390 is further at least designed to drive at least the inverter 1350 in such a way that the wind farm 1000, at the electronic supply grid 2000, in the steady state appears to be dynamic like an electromechanical synchronous machine.

In addition, the control unit or the power flow unit 1300 is also at least designed in such a way that the wind farm 1000 can be operated in such a way as to apply a voltage to the electrical power supply grid 2000.

Provided herein are multiple advantages, which are listed below, but not exclusively:

1. Fulfilment of specific grid requirements for emulating a synchronous machine which would otherwise require a very high degree of complexity for matching the properties of present installations (both in terms of hardware and software), for example only with the use of a special unit at the wind farm point of connection. A virtual impedance can be implemented by the closed-loop control of the virtual synchronous machine without necessitating any additional hardware components.

2. Since the inverter on the farm side acts as a voltage-applying inverter, the stability of the entire farm is increased. Each installation will always measure a symmetrical voltage at its terminals even if faults occur on the electrical power supply grid or the actual grid voltage is severely subjected to harmonics. The closed-loop control of the power flow unit on the farm side, i.e., by the active rectifier, therefore represents a virtually ideal voltage source for the wind power installations injecting into the wind farm grid, with the result that virtually no stability problems occur for the closed-loop control of the injection by the wind power installations. They are therefore largely decoupled from any stability problems of the transmission grid or power supply grid at the point of common coupling. The grid-side inverter of the power flow unit is regulated as a virtual synchronous machine and it is known that a virtual synchronous machine can be operated stably even in very weak grids. Therefore, the stability problems of the injection by the wind power installation are first displaced to the point of common coupling of the farm, where they can be resolved centrally using very stable closed-loop control.

3. The rectifier and the inverter of the power flow unit provide the functionality of a voltage-applying inverter in each case for the grid and for the wind farm. Since, in addition, an energy store is contained in the power flow unit, a black-start capability for the entire wind farm can be achieved. The black start takes place in two steps: first, the wind farm grid is subjected to a voltage by the stored energy in the power flow unit and the voltage application of the farm-side inverter, i.e., the rectifier. If the wind power installations are ready to inject, a voltage can be applied on the power supply grid side as well, whereby first near operating devices (lines, transformers) are subjected to a voltage and then increasingly active power can be injected from the wind power installations into the grid which is thus subjected to a voltage.

4. Since the farm is connected to a back-to-back converter to the grid, the individual installations do not need to inject any reactive power (or now only a very low level). In addition, owing to the reduced apparent current amplitude in the wind farm, there is a reduction in the losses in the cables of the wind farm.

5. Each wind power installation can be equipped with fewer power cabinets. The reactive power setting capability of the wind farm is completely provided by the power flow unit.

6. The control unit of the power flow unit replaces a farm closed-loop control unit of the wind farm. Owing to the application of a voltage on the wind farm side including the possibility of providing closed-loop control for the frequency in the wind farm grid as a deviation from the grid frequency, the frequency can also be used for communication between the power flow unit and the wind power installations (for example active power control by virtue of a change in frequency with power-frequency droop). This also results in a reduced degree of communication between the power flow unit and the wind power installations in comparison with the present communication of setpoint power values. The communication of setpoint reactive power values is also dispensed with completely.

7. Classic problems of conventional transformers are avoided, for example inrush currents and saturation (voltage quality).

8. In addition, it is made possible for the wind farm or only part of the wind farm to be able to be connected directly to a multi-terminal HVDC transmission grid.

The invention claimed is:

1. A wind farm for supplying electrical power into an electrical power supply grid having a power supply grid voltage and a power supply grid frequency and being associated with a rated power supply grid voltage and a rated power supply grid frequency, the wind farm comprising:
   a plurality of wind power installations;
   an electrical wind farm grid coupled to the plurality of wind power installations and having a wind farm voltage and a wind farm frequency and being associated with a rated wind farm voltage and a rated wind farm frequency; and
   a power flow control device configured to couple the electrical wind farm grid to the electrical power supply grid such that the electrical power generated by the plurality of wind power installations is supplied to the electrical power supply grid, wherein the power flow control device includes:
      a DC link configured to transmit the electrical power generated by the plurality of wind power installations;
      a battery coupled to the DC link;
      an inverter, coupled to the DC link, configured to supply at least the electrical power generated by the plurality of wind power installations into the electrical power supply grid; and
      a controller configured to drive at least the inverter such that the wind farm, at the electrical power supply grid, in steady state dynamically emulates an electromechanical synchronous machine.

2. The wind farm as claimed in claim 1, wherein the power flow control device includes:
   a rectifier, coupled to the electrical wind farm grid and to the DC link, configured to transmit at least the electrical power generated by the plurality of wind power installations.

3. The wind farm as claimed in claim 2, wherein the power flow control device includes:
   a DC-DC converter coupled between the rectifier and the inverter; and
   a further DC link, coupled between the rectifier and the inverter, configured to selectively isolate the rectifier from the inverter.

4. The wind farm as claimed in claim 3, wherein the battery is coupled to the DC link at a point between the DC-DC converter and the inverter.

5. The wind farm as claimed in claim 1, wherein the power flow control device includes:
   a DC-DC converter coupled between the DC link and the battery, wherein the DC-DC converter is configured such that the battery receives and/or supplies battery electrical power independently of a power flow between the wind farm and the electrical power supply grid.

6. The wind farm as claimed in claim 1, wherein the power flow control device is configured such that the wind farm is operated to apply a voltage to the electrical power supply grid.

7. A power flow control device for a wind farm, including a plurality of wind power installations, configured to couple an electrical wind farm grid to an electrical power supply grid such that electrical power generated by the plurality of wind power installations is supplied into the electrical power supply grid, the power flow control device comprising:
   a DC link configured to transmit the electrical power generated by the plurality of wind power installations;
   a battery coupled to the DC link;
   an inverter, coupled to the DC link, configured to supply the electrical power generated by the plurality of wind power installations into the electrical power supply grid; and
   a controller configured to drive at least the inverter in-such that the wind farm, at the electrical power supply grid, in steady state dynamically emulates an electromechanical synchronous machine.

8. The power flow control device as claimed in claim 7, comprising:
   a rectifier, coupled to the electrical wind farm grid and to the DC link, configured to transmit the electrical power generated by the plurality of wind power installations.

9. The power flow control device as claimed in claim 8, comprising:
   a DC-DC converter, coupled between the rectifier and the inverter; and
   a further DC link, coupled between the rectifier and the inverter, configured to selectively isolate the rectifier from the inverter.

10. The power flow control device as claimed in claim 9, wherein the battery is coupled to the DC link at a point between the DC-DC converter and the inverter.

11. The power flow control device as claimed in claim 7, further comprising:
    a DC-DC converter coupled between the DC link and the battery, wherein the DC-DC converter is configured such that the battery supplies and/or receives battery electrical power independently of a power flow between the wind farm and the electrical power supply grid.

12. The power flow control device as claimed in claim 7, wherein the power flow control device is configured such that the wind farm is operated to apply a voltage to the electrical power supply grid.

* * * * *